March 19, 1957
A. E. KUPRION
2,785,946
PHOTOGRAPHIC CAMERAS
Filed June 29, 1945
2 Sheets-Sheet 1
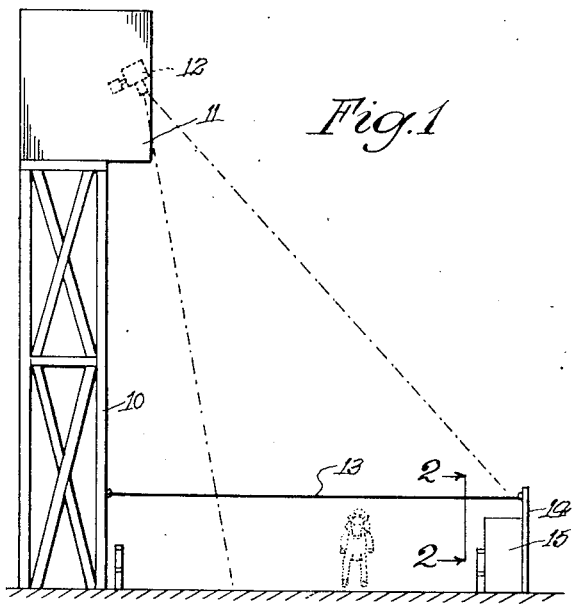
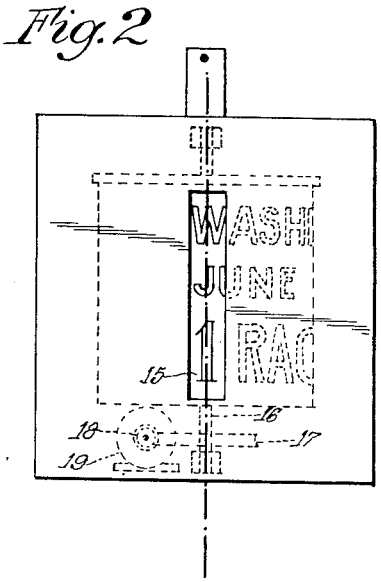
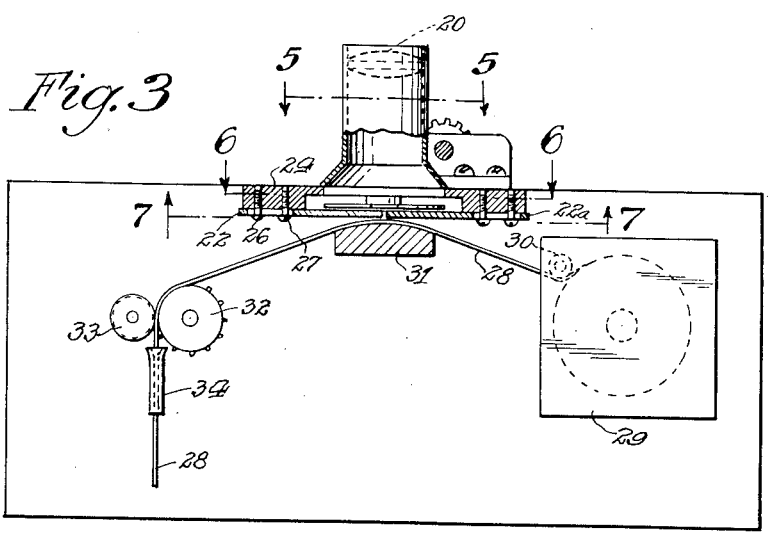
Inventor
Arthur E. Kuprion
by Henry Bosh
Attorney.

March 19, 1957     A. E. KUPRION     2,785,946
PHOTOGRAPHIC CAMERAS
Filed June 29, 1945     2 Sheets-Sheet 2
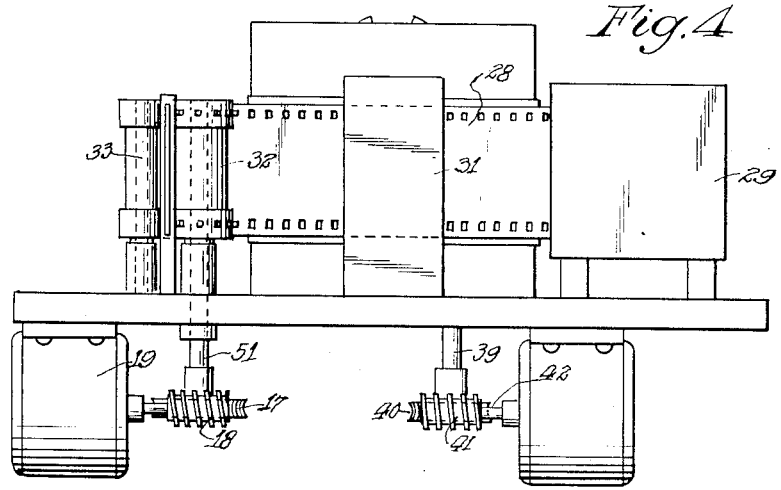

United States Patent Office 2,785,946
Patented Mar. 19, 1957

2,785,946

PHOTOGRAPHIC CAMERAS

Arthur E. Kuprion, Louisville, Ky.

Application June 29, 1945, Serial No. 602,201

28 Claims. (Cl. 346—107)

The invention relates to a photographic camera and particularly to recording photographically a succession of moving objects as they cross a given line.

It is an object of the invention to provide a novel method for photographically recording stationary objects on the same film on which moving objects are photographed.

A further object constitutes the provision of a camera permitting the simultaneous recording of moving and stationary objects on the same film.

A still further object constitutes the provision of a camera having a plurality of sets of adjustable aperture plates and means for neutralizing the speed of movement of the film so that a sharp picture of a stationary object may be obtained on the film.

A still further object constitutes the provision of a camera enabling a plurality of independent exposures to be made simultaneously.

It is also an object to provide a novel method for permitting stationary and moving objects to be photographically recorded on the same film.

With these and other important objects in view which will become apparent from a perusal of the invention, the latter comprises the means described in the following specification particularly pointed out in the claims forming a part thereof, and illustrated in the accompanying drawings, in which Fig. 1 is a diagrammatic view illustrating the application of the invention.

Fig. 2 is a detail view from the line 2—2 of Fig. 1.

Fig. 3 is a plan view of a camera with parts broken away and parts in section.

Fig. 4 is an elevational view of the camera.

Fig. 5 is a section on the line 5—5 of Fig. 3.

Fig. 6 is a section on the line 6—6 of Fig. 3.

Fig. 7 is a section on the line 7—7 of Fig. 3 and

Fig. 8 is a view of a portion of the developed film.

Referring to the several views of the drawings 10 generally indicates a stand on which is mounted a viewing housing 11 where a camera 12 is supported for recording a succession of moving objects. A wire 13 is stretched from the stand 10 to a post 14 indicating the finish line. A revolving sign 15 is secured to the post and is provided with a driven shaft 16 carrying a gear 17 in mesh with a pinion 18 on the shaft of a motor 1a. The sign preferably is revolved at the same high rate of speed as the objects move and the vertical center of the sign coincides with the finish line as will be apparent from a reference to Fig. 2.

The camera 12 in accordance with my invention is specially constructed for recording simultaneously high speed moving objects and stationary objects and to produce sharply defined and clear records.

The camera includes the standard lens 20 and three sets of superposed aperture plates 21, 21a, 22, 22a and 23, 23a mounted on the casing wall 24.

The aperture plates are each provided with a slot 25 and screws 26 and 27 in each slot adjustably secure the plates to the wall 24. A film 28 unwinds from a magazine 29 past a guide roller 30 and is threaded between the aperture plates, and a guide pressure plate 31. Thence the film 28 is led to a drive and take up sprocket 32 and a guide roller 33 to a film outlet chute 34.

The photographic reproduction of the moving objects occurs through the gap defined by the aperture plates 22, 22a.

The narrow gap of the aperture plates 21, 21a and 23, 23a is controlled by shutter blades 35.

The shutter blades 35 are each mounted on a shaft 36 carrying a pinion 37 in mesh with a gear 38 on a vertical shaft 39 whose lower end is geared by a gear wheel 40 and worm 41 to the horizontal shaft 42 of variable speed controlled motor 43 so that the shutter blades are driven synchronously and at a speed controlled by the motor 43.

Each shutter blade has two sets of openings 44 and 45. The openings 44 are longer than the openings 45 for a purpose hereinafter explained.

It is evident that the camera has three separate exposures, the center one 22, 22a being for moving objects, while the aperture plates 21, 21a and 23, 23a are for stationary objects.

The shutter blades being driven at high speed the motion of the film is counteracted by reason of the fact that the time of exposure is infinitesimally small so that a distortion of the picture due to the motion of the film is obviated.

Thus the finish line as shown in Fig. 8 is sharply reproduced as at 46 and 47 and varies in length according to the depth of the openings in the shutter blade.

The film also contains reproductions 48 of the sign and reproductions 49 of the moving object.

The film is driven by a variable speed controlled motor 19 which is geared to a shaft 51 carrying the film feed sprocket 32.

It will appear that if a straight-edge is aligned across the film of Fig. 8 with any pair of oppositely corresponding finish line images 46—46 or 47—47, then the photographed positions of the objects 49 relative to the actual finish line may be accurately determined from the film negative, and in any proper, positive projection of said negative, it would not be possible to falsify or alter such recorded positions of the objects relative to the finish line.

The drawing shows one embodiment of the invention, but numerous changes and alterations may be made without departing from the spirit of the invention.

I, therefore, do not limit myself to details of construction or arrangement of parts, as shown, but wish to include all changes, variations, modifications and provisions constituting departures within the scope of the invention as defined in the appended claims.

I claim:

1. A photographic camera for producing records of moving objects crossing a finishing line, including a plurality of sets of aperture plates, the plates of each set being spaced to define three exposure openings in a single vertical plane of view, means for moving a film across the apertures of said plates at a speed correlated to that of said moving object to photograph said moving objects through the central one of said apertures the combined exposure openings equaling in height substantially the width of the film, a single lens for said exposure openings, and shutter means for controlling the exposure time of the upper and lower exposure opening to obtain still-picture reproductions of the finish line at the edges of the film in co-relation to the reproduction of a moving object through the center opening.

2. A photographic camera for producing records of moving objects crossing a finishing line, including a plurality of sets of aperture plates, the plates of each set being spaced to define a plurality of exposure openings in a single vertical plane of view, the combined exposure openings equaling in height the width of the film, means for travelling a strip film longitudinally across said openings, at rate to photograph said moving objects, means for adjusting said plates to vary the width of said openings, and shutter means for periodically obturating only the upper and lower openings to obtain reproduction of the finish line only at the opposite edges of the film in co-relation to a simultaneous reproduction of a moving object through the center opening.

3. A photographic camera for simultaneously photographing stationary and moving objects and having a moving film and three apertures aligned transversely of said film, means for adjusting said apertures to vary the width thereof, and shutter blades for the topmost and lowermost aperture for direct recording of stationary objects on the corresponding edge portions of the film, the moving speed of said film being correlated to that of said moving objects for simultaneously recording moving objects through the center one of said apertures.

4. The combination, with a finish wire across a courseway on which racing objects move past said wire, of photograph recording means comprising: a camera having an objective optically aligned with said wire and positioned above one end thereof to include said courseway and said wire substantially in focus, means moving a strip film in the focal plane of said objective in the longitudinal direction of said courseway and at approximately the speed of the racing objects to effect a motion picture recording of the same relative to said wire, and shutter means for periodically obturating and exposing only the opposite edgewise portions of said film to the image-forming rays from the opposite endwise extremities of said wire, whereby to still-picture record only said endwise portion of the wire on said film as reference marks simultaneously with the motion-picture recording in the central portion of said film of said racing objects.

5. The method of making a photographic finish record for racing objects on a raceway having a transverse finish line, which comprises photographing on the same photosensitive surface, a picture of the racing object or objects in a central region of said surface in an area of said raceway included between opposite ends of said line while simultaneously preventing photographic recording of the portions of said line intermediate said ends, with said ends photographically recorded as finish-line reference marks, by moving said surface in relation to image-resolving optical means in focal alignment with said raceway and intermediate regions of said line, at approximately the speed of the racing objects, and during said movement of said surface intermittently exposing and occluding opposite portions of said surface to image-forming rays from said opposite ends of the line at a speed proportioned to the rate of movement of said sensitive surface to effect a series of substantially sharp images of said line ends.

6. The method of photographing racing objects relative to a finish wire on a raceway to suppress an image of the wire in its central regions between the endwise regions thereof without suppressing images of both ends of the wire, or the images of said objects in a predetermined mid region between said ends, which method comprises: making an exposure of said objects at and near said central regions of the wire on a moving film and simultaneously effecting rapid occlusions of only the image-forming rays from desired lengths of the wire near said ends thereof at a speed proportioned to said exposure to show said ends substantially in focus as a series of intermittent reference lines along opposite sides only of said mid region.

7. A photofinish camera for photographing objects moving relative to a tangible finish line disposed across a courseway, said camera including means for travelling a film across its focal plane, means defining a slit aperture in said camera extending transversely of the film in the direction of its travel to optically cover the width of said film, said camera being adapted to be focused on said courseway with said aperture slit aligned with the entire finish line including opposite end portions thereof, and shutter means intermittently obturating the field of view only in the opposite terminal end portions of said aperture, whereby said moving objects are photographed through the central portions of said slit while only the terminal end portions of said finish line are still-photographed at opposite edge regions of said film and the intermediate portions of said finish line are not visibly photographed in the field of said aperture covered by said shutter means.

8. In a photographic camera, means for moving a strip film in the focal plane thereof, means defining a slit aperture extending transversely of the axis of movement of said film so as to contain a field of view extending transversely across said axis and film to include the opposite edge portions thereof, and shutter means operable to intermittently expose and mask only the opposite terminal regions of said aperture while leaving a substantial intermediate extent of said aperture continually open for effectively photographing only objects moving relative to said camera, while the field of view of the shuttered terminal portions of said aperture is effective only for photographing objects at rest relative to said camera.

9. A photographic camera for simultaneously photographing on a single strip film both stationary and moving objects on certain predetermined portions of said film, said camera comprising means for travelling a strip film in the focal plane of said camera, means defining a slit aperture having a narrow field of view which extends entirely across said strip film transversely of its direction of travel, and shutter means intermittently occulting the light received by said camera at the opposite end regions only of said aperture with the intervening portion of said aperture open and for the purpose of photographing moving objects on a mid portion of said film between the opposite longitudinal edges thereof, said shutter means operating to photograph a narrow still object extending across substantially the entire field of view through said aperture on said film strip only in the region covered by said shutter means and so that said narrow object does not appear on a substantial predetermined area of said mid portion of the film.

10. A camera in accordance with claim 9 in which said aperture-defining means is adjustable in a mid section and at opposite flanking terminal portions thereof, whereby the width of said aperture covering said mid portion of the film may be rendered optically wider than the width of the aperture in the region of said terminal portions thereof.

11. A moving strip-film-type camera for photographing moving objects on a courseway as said objects pass a relatively stationary filamentary object extending thereacross in such manner that said moving objects are recorded in a mid portion of said film while said stationary object is photographically obscured in said mid portion, but appears in focus on opposite sides of said mid portion, said camera including objective lens means optically covering the entire width of said strip film, a slit aperture aligned with said lens means to define a narrow field of view laterally across said film including said mid portion thereof, means for traveling said film lengthwise past said aperture in the focal plane of said lens means, and shutter means acting relative to the opposite longitudinal end regions of said aperture and movable to alternately block and pass light only through said end regions of the aperture, together with drive means for travelling said film at a rate adjustable relative to the rate of movement of said moving object to photographically stop the motion thereof for recording on said mid portion, and drive means for moving said shutter means at a rate to effect still-photographing of the terminal regions of said still object on opposite sides of said mid portion, as aforesaid.

12. The method of photographing objects moving along a courseway relative to a narrow transverse reference line so as to show opposite end portions of said line but not a predetermined intermediate portion thereof, while showing legible images of said moving objects substantially in stopped motion in said mid portion and unobscured by any apparent superimposed image of said line in said mid portion, said method comprising, to wit: focusing an image of said courseway including said line upon a strip film, confining the field of view of the rays forming said image to a narrow band extending crosswise of said film and including a plane also containing said line, travelling said film relative to said narrow band at a rate correlated to the rate of movement of said objects to form a series of substantially sharp still images of said moving objects in a mid-region on said film, and simultaneously interrupting the image-forming rays only near the opposite end regions of said band at a rate correlated to the rate of travel of said film to produce a substantially sharp image of the end regions only of said line in positions respectively located on opposite sides of said image of the objects in the mid region.

13. A device for photographically recording the order in which a plurality of contestants cross the finish line of a race course comprising a camera having a film therein; means in said camera for selectively projecting an image of the finish line and the contestants as they cross the finish line onto the central area of said film; and means carried in fixed predetermined relation to said camera and arranged in predetermined relation to said first mentioned means for simultaneously imposing respectively aligned and distinguished reference markings at spaced intervals along the opposite longitudinal marginal edges of the film in parallel relation to the image of the finish line formed by said first mentioned means to provide aligned axially spaced pairs of respectively matching reference markings distinguished by corresponding repetitious change in length on each of said edges adapted for use in constructing a determinative finish line parallel to said image of said finish line and tangent to the leading portion of the images of the contestants photographed on the central area of the film.

14. A camera for photographically recording the order in which a plurality of contestants cross the finish line of a race course comprising selectively operable means for continuously moving a film through a camera; an exposure slot adapted to cover a narrow field of view containing the finish line of the race course; lens means associated with said slot for forming an image of said field of view on the central area of the film; and means carried in fixed predetermined relation to said camera and arranged in predetermined relation to said lens means for simultaneously imposing respectively aligned reference markings of changing length at spaced intervals along the opposite longitudinal marginal edges of the film in parallel relation to the image of the finish line formed by said lens means to provide aligned, axially spaced pairs of reference markings of matching lengths in each pair adapted for use in constructing a determinative finish line parallel to said image of said finish line and tangent to the leading portion of the images of the contestants photographed on the central area of the film.

15. A device for photographically recording the order in which a plurality of contestants cross the finish line of a race course comprising a camera having a film therein; means in said camera for projecting an image of the finish line and the contestants as they cross the finish line onto said film; and means in said camera and arranged in predetermined relation to said first mentioned means for simultaneously imposing respectively aligned photographic reference markings at spaced intervals along the opposite longitudinal marginal edges of the film in parallel relation to the finish line projected by said first mentioned means to provide aligned axially spaced pairs of reference markings adapted for use in constructing a determinative finish line parallel to said image of said finish line and tangent to the leading portion of the images of the contestants photographed on the central area of the film.

16. A camera for photographically recording the order in which a plurality of contestants cross the finish line of a race course comprising means for continuously moving a film through a camera; an exposure slot adapted to cover a narrow field of view of the race course; lens means associated with said slot for forming an image of said field of view on the film; and means carried in said camera and arranged in predetermined relation to said lens means for simultaneously imposing respectively aligned photographic reference markings at spaced intervals along the opposite longitudinal marginal edges of the film in parallel relation to the image of the finish line formed by said lens means to provide aligned axially spaced pairs of reference markings adapted for use in constructing a determinative finish line parallel to said image of said finish line and tangent to the leading portion of the images of the contestants photographed on the central area of the film.

17. A camera for photographically recording the order in which a plurality of contestants cross the actual finish line of a race course comprising means for moving a film through said camera; a main objective lens means for photographing the contestants as they cross the finish line onto the central area of said film; a pair of axially aligned, axially spaced exposure slits disposed along the path of movement of said film in axial parallelism to the vertical axis through said lens means and the actual finish line, one opposite each longitudinal marginal edge of said film; a revolving drum carried in fixed predetermined relation to said camera and finish line and disposed with its axis of rotation parallel to the axes of said pair of slits and one of its peripheral end regions in the field of view through at least one of said slits, and having axially and circumferentially spaced markings on its peripheral surface constituting identifying indicia near the inner ends of selected ones of said lines for identification purposes; and means optically associated with said pair of exposure slits for forming successive spaced images of said identifying indicia along one edge of the film and images of the opposite ends of said lines along said opposite longitudinal marginal edges of the film in axial alignment to provide successive aligned axially spaced pairs of reference lines adapted for use in constructing a determinative finish line for determining the order of finish of said contestants.

18. A device for photographically recording the order in which a plurality of contestants cross the finish line of a race course, said device comprising a camera and means for travelling a film therein, means in said camera for projecting an image of the opposite ends, at least, of the finish line, and the contestants as they cross the finish line, onto said film, said last-mentioned projecting means including aligned aperture formations in said camera each opposite one of the opposite edge portions of said film, and a central aperture formation extending in parallelism with the aforesaid aperture formations and opposite a central portion of said film, together with means timing the exposure of said film relative to all of said aperture formations for reproducing at opposite edges of said film opposite pairs of axially aligned, serially spaced, reference lines in parallelism with said finish line, and said ends thereof, as well as images of said contestants in the field of view including said finish line, said reference lines being adapted for use in constructing a determinative finish line to determine the order of finishing for said contestants, the accuracy of said constructed line being proved by reference to its parallelism with said reference marks.

19. Photofinish recording means comprising a camera having means therein for moving a strip film and means providing an elongated aperture slit past which said film is moved, aperture means aligned with said first-mentioned aperture slit and at opposite ends of the latter and each respectively disposed opposite an edge region of said film, said camera being aligned with the finish line of a race course with all of the aforesaid aperture elements aligned in parallelism with the plane containing said finish line, and optical means associated with each of the aforesaid aperture elements and operable to form transversely extending, and respectively aligned pairs of short reference lines at opposite edges of said film, and to form in the central area of said film, between said lines, images of the contestants in the immediate region of the finish line, whereby the position of the contestants relative to said finish line may be determined by constructing a determinative finish line parallel to any one, or any pair of correspondingly opposite, reference marks.

20. Recording means in accordance with claim 19 in which the said optical means associated with said second-mentioned aligned aperture means is provided with shutter means including succeeding shutter apertures of alternate width in the direction of the length of said finish line, whereby corresponding reference lines are characterized by alternate differences in length on both edges of the film.

21. The method of making a photographic record of the order in which a plurality of contestants cross the finish line of a race course and proving the determination of the winning contestant which comprises the steps of photographically applying respectively aligned reference marks at longitudinally spaced intervals along the opposite marginal edges of a film strip by projecting and recording a series of photographic images of the actual finish line of the race course on opposite edge portions, at least, of said film to define said marks and projecting and recording photographic images of the contestants on the central part of the film in the region between said projected images of the finish line while preventing recording of any apparent image of said line in said central part of the film, and determining the winning contestant by the positional relation of said recorded images of the contestant on said film to the recorded images of said parts of the finish line by reference to any pair of corresponding reference marks on opposite edges of said film, any mark of either series being distinguished in appearance from any marks immediately flanking it and both marks of any pair being contained in a supposed straight line which would be parallel to the image on the film of the actual line if such image were recorded thereon.

22. The method of making a photographic record of the order in which a plurality of contestants cross the finish line of a race course and proving the determination of the relative positions of the contestants which comprises the steps of photographically applying spaced, parallel transversely-extensive images of reference marks along opposite edges of a photograph, said reference marks being parallel to said line and occurring in corresponding pairs, axially aligned, one at each edge of the photograph, and succeeding reference-mark lines at both said edges having corresponding lengthwise distinguishing characteristics whereby the marks of each said pair may be matched, and including on said photograph in a region between said reference marks, photographic images of said contestants, and determining and proving the position of any said contestants relative to the finish line by the positions thereof relative to any said pair of reference marks.

23. The method of making photographic records of the finish of a race in which the contestants move relative to a finish line across a raceway, which method comprises the exposure of a moving length of photographic film through objective lens means to a field of view extending crosswise of said raceway and including said finish line, moving said film at a speed approximating that of the contestants to record the images of the latter at a time when the contestants are approaching and crossing said line, and exposing only the opposite lateral edge regions of said film simultaneously through said lens means on diametrically opposite sides of the optical center of the latter to light rays from the opposite end regions of said line which are interrupted at a rate relative to the speed of movement of said film which impresses on said film while it is in motion legibly clear images of said end regions of the line for reference purposes to indicate the accurate and actual position of the finish line relative to the contestants.

24. The method of photographically recording the relationship of race contestants relative to a finish line which comprises: photographing the contestants through a slit aperture on a moving length of film in a field of view which includes said line and at a film speed which prevents image recording of a mid-portion of said line on said film but which records images of said contestants in the region adjoining said line, at least, and causing light from the opposite endwise parts of said line flanking said mid portion to be interrupted at a predetermined rate and to be directed onto said moving film in the areas along the opposite longitudinal edges thereof to record along each said edges a series of evenly spaced reference marks with each mark along one said edge in precise, rectilinear alignment with a paired companion mark on the opposite edge for purposes of providing on the recording paired guide marks to be used in selectively establishing an accurately constructed finish line across the recorded field of view at any of a plurality of points.

25. Photofinish apparatus including objective lens means and means for travelling a length of film in the focal plane of said lens means at a determined rate for photographically recording thereon images of objects in motion relative to said lens means, and light-admitting devices respectively situated in alignment with the opposite edgewise areas of said film which are lateral to the direction of travel thereof for respectively admitting and directing light from reference-mark objects to said edgewise areas to record photographic images of said reference-mark objects only along the lateral edges of the film for use as guides in constructing a finish line to determine the leading or winning contestants in a race, as depicted in the aforesaid recording, in an intermediate area of said film between said edgewise areas.

26. Photographic apparatus for recording the relationship of racing contestants relative to a straight finish line and including lens means, means for travelling a length of film in the focal plane of said lens means at a rate to record images of the contestants in motion relative to said line, said rate being selected also to prevent recording of any visible image of a predetermined mid-portion of said line between opposite endwise portions thereof, and means for directing interrupted light from said opposite endwise line portions, respectively onto opposite edgewise areas along the longitudinal edges of said film and at a rate of interruption to record along each said edgewise area a series of uniformly spaced reference marks in the form of images of the respective opposite endwise portions of said line, whereby to provide a multiplicity of pairs of said marks along the length of the film in which each pair consists of one said mark on each said edgewise area, and the marks of each said pair are in rectilinear alignment by reason of being images of different, axially spaced parts of the same straight line.

27. A photofinish camera comprising lens means adapted to be focused upon racing contestants as the same approach and cross a photographically visible finish line, means for moving a length of film in the focal plane of said lens means at a rate to record thereon images of said contestants, at least, in a mid-region of said film between the opposite longitudinal edges thereof, and means for photographically recording a series of spaced reference marks along the opposite sides of said film adjoining said opposite edges thereof, with each said reference mark in each series axially aligned with a companion mark in the opposite series to constitute a pair of reference marks, the reference marks in each said pair defining a straight line which is at all times parallel to any image of said finish line resolved by said lens means during recording as aforesaid, and which line accurately represents the relative position of the actual finish line with respect to said contestants.

28. A method for making a photographic record of the order in which a plurality of contestants move relative to the finish line of a race course in a competitive event and proving the determination of the winning contestant, comprising the steps of photographically recording during the event a series of longitudinally spaced reference marks along each edge of a film strip, each mark of one series being aligned transversely of said strip with a mark of the opposite series so that a line connecting two transversely aligned marks will lie at right angles to the longitudinal axis of said film strip, forming photographic images of each contestant on the central portion of said film strip in successive order as the contestants pass the actual finish line of the race course, and constructing a determinative finish line on said film strip tangent to the leading portion of the image of the leading contestant and parallel to an imaginary line joining a transversely aligned pair of said marks.

References Cited in the file of this patent

UNITED STATES PATENTS

| | | |
|---|---|---|
| 1,411,359 | Jenkins | Apr. 4, 1922 |
| 1,782,860 | Reipert | Nov. 25, 1930 |
| 1,826,664 | Hopkins | Oct. 6, 1931 |
| 2,257,100 | Belock | Sept. 30, 1941 |
| 2,292,825 | Dilks | Aug. 11, 1942 |
| 2,320,350 | Del Riccio | June 1, 1943 |
| 2,327,581 | Del Riccio | Aug. 24, 1943 |
| 2,403,911 | Crowley | July 16, 1946 |
| 2,424,592 | Terwilliger | July 29, 1947 |